United States Patent
Wang (10) Patent No.: US 10,608,833 B2
(45) Date of Patent: Mar. 31, 2020

(54) CONTROL SYSTEM AND POWER LINE NETWORK CONTAINING THE SAME

(71) Applicant: BOE TECHNOLOGY GROUP CO., LTD., Beijing (CN)

(72) Inventor: Hong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/527,012

(22) PCT Filed: Nov. 7, 2016

(86) PCT No.: PCT/CN2016/104885
§ 371 (c)(1),
(2) Date: May 16, 2017

(87) PCT Pub. No.: WO2017/133287
PCT Pub. Date: Aug. 10, 2017

(65) Prior Publication Data
US 2018/0331844 A1 Nov. 15, 2018

(30) Foreign Application Priority Data
Feb. 3, 2016 (CN) .......................... 2016 1 0077530

(51) Int. Cl.
*H04L 12/28* (2006.01)
*G05B 15/02* (2006.01)
(Continued)

(52) U.S. Cl.
CPC .......... *H04L 12/2816* (2013.01); *G05B 15/02* (2013.01); *G05B 19/41855* (2013.01);
(Continued)

(58) Field of Classification Search
CPC .............. H04B 3/54; H04B 2203/5458; H04L 12/2803; H04L 12/2809; H04L 12/2816;
(Continued)

(56) References Cited

U.S. PATENT DOCUMENTS 4,174,517 A * 11/1979 Mandel .............. G05D 23/1905
307/140
4,749,992 A * 6/1988 Fitzemeyer ............ G01D 4/004
340/12.32
(Continued)

FOREIGN PATENT DOCUMENTS

| CN | 200962254 Y | 10/2007 |
|---|---|---|
| CN | 101577654 A | 11/2009 |
| CN | 101742752 A | 6/2010 |

OTHER PUBLICATIONS

1st Office Action dated Sep. 25, 2017 in CN 201610077530.5.
(Continued)

*Primary Examiner* — Orlando Bousono
(74) *Attorney, Agent, or Firm* — Syncoda LLC; Feng Ma (57) ABSTRACT

A control system for controlling a power line network having a power line, at least one electric appliance and at least one controller includes a central control unit, configured to realize programmable controls over the appliance by the controller with signals transmitted through the power line. An on-site control unit includes at least one modulator and at least one demodulator coupled with the central control unit. Each modulator is configured, upon receiving a first control signal from the controller, to generate and transmit a second control signal to the central control unit that is configured, upon receiving the second control signal, to generate and transmit a third control signal to the demodulator. Each demodulator is configured, upon receiving the third control signal, to generate and transmit a fourth control signal to the appliance.

17 Claims, 3 Drawing Sheets

(51) Int. Cl.
*G05B 19/418* (2006.01)
*H04B 3/54* (2006.01)

(52) U.S. Cl.
CPC ...... *H04B 3/54* (2013.01); *G05B 2219/25011* (2013.01); *H04B 2203/5445* (2013.01); *H04B 2203/5462* (2013.01); *Y02B 70/3241* (2013.01); *Y04S 20/227* (2013.01)

(58) Field of Classification Search
CPC ............ H04L 2012/2843; G05B 15/02; G05B 19/41855
See application file for complete search history.

(56) References Cited

U.S. PATENT DOCUMENTS

| | | | | |
|---|---|---|---|---|
| 5,554,968 A * | 9/1996 | Lee | ........................ | H04B 3/542 340/310.18 |
| 5,586,174 A * | 12/1996 | Bogner | ............... | H02J 13/0024 340/533 |
| 5,680,445 A * | 10/1997 | Bogner | ............... | H02J 13/0024 340/553 |
| 5,774,528 A * | 6/1998 | Bogner | ............... | H04L 12/2825 340/533 |
| 5,905,442 A * | 5/1999 | Mosebrook | ........ | G05B 19/0423 |
| 6,229,433 B1 * | 5/2001 | Rye | .................... | H04L 12/2803 340/12.5 |
| 6,441,723 B1 * | 8/2002 | Mansfield, Jr. | ........ | G08B 25/06 340/538 |
| 6,750,781 B1 * | 6/2004 | Kim | .................... | H02J 13/0082 340/12.32 |
| 2001/0025349 A1 * | 9/2001 | Sharood | ............. | G06Q 30/0235 713/340 |
| 2003/0016129 A1 * | 1/2003 | Menard | ................ | G08B 25/008 340/531 |
| 2004/0122531 A1 * | 6/2004 | Atsuta | ................. | H04L 12/2803 700/1 |
| 2005/0162282 A1 * | 7/2005 | Dresti | .................... | G05B 15/02 340/12.3 |
| 2007/0220907 A1 * | 9/2007 | Ehlers | .................... | F25B 49/005 62/126 |
| 2008/0044006 A1 * | 2/2008 | Kitagawa | ............... | G08C 17/00 379/433.01 |
| 2008/0218148 A1 * | 9/2008 | Robertson | .................. | H02J 3/14 323/349 |
| 2009/0323257 A1 * | 12/2009 | Sarid | ........................ | H02G 3/00 361/631 |
| 2011/0130887 A1 * | 6/2011 | Ehlers, Sr. | ............ | F25B 49/005 700/296 |
| 2012/0128081 A1 * | 5/2012 | Hikihara | .................. | H04B 3/54 375/257 |
| 2013/0010018 A1 * | 1/2013 | Economy | .............. | H04W 76/10 345/691 |
| 2013/0044767 A1 * | 2/2013 | Seelman | ............. | H04L 12/2807 370/474 |
| 2013/0046867 A1 * | 2/2013 | Seelman | ............. | H04L 12/2807 709/221 |
| 2013/0046881 A1 * | 2/2013 | Seelman | ............. | H04L 12/2809 709/224 |
| 2014/0134550 A1 * | 5/2014 | Huang | ...................... | F23N 5/00 431/72 |
| 2014/0203710 A1 * | 7/2014 | Li | ...................... | H05B 33/0857 315/129 |
| 2014/0268958 A1 * | 9/2014 | Chapman | ............ | H02M 7/5395 363/97 |
| 2015/0127862 A1 * | 5/2015 | Fan | ........................ | H04B 3/542 710/110 |
| 2015/0220075 A1 * | 8/2015 | Ziv | ........................ | G05B 15/02 340/12.5 |
| 2015/0256028 A1 * | 9/2015 | Suman | ............... | H05B 37/0263 307/23 |
| 2015/0256355 A1 * | 9/2015 | Pera | .................... | H04L 12/2803 700/90 |
| 2015/0256665 A1 * | 9/2015 | Pera | .................... | H04L 12/2803 455/420 |
| 2016/0224083 A1 * | 8/2016 | Dent | ........................ | G06F 1/266 |

OTHER PUBLICATIONS

International Search Report and Written Opinion dated Feb. 7, 2017 in PCT/CN2016/104885.
4th Office Action dated Sep. 27, 2019 in CN 201610077530.5.

* cited by examiner

CONTROL SYSTEM AND POWER LINE NETWORK CONTAINING THE SAME

CROSS-REFERENCE TO RELATED APPLICATION

The present application claims priority to Chinese Patent Application No. CN201610077530.5, filed on Feb. 3, 2016, the disclosure of which is hereby incorporated by reference in its entirety.

TECHNICAL FIELD

The present disclosure relates generally to the field of power transmission and transformation technologies, and more specifically to a control system for a power line network and a power line network having the control system.

BACKGROUND

Power transmission and transformation technologies are critical for electrical power to be transmitted from power plants to users. At present, the entry standard of a household power grid is 220V/50 Hz or 110V/60 Hz. As the power grid for buildings or communities is complex, the entry voltage needs to be filtered and isolated so as not to affect the operation of the household power grid, to thereby guarantee that both the entry voltage and frequency meet the requirements.

A household power grid is a type of power line network and involves various electric appliances. While a majority of the electric appliances, such as electric lamps, switches and outlets, involve switches, other electric appliances, like refrigerators and air conditioners, involve multiple states. Specifically, most commonly used household appliances and elements are classified to be single-state, dual-state and multi-state. Single-state electric appliances include outlets, monitoring cameras, etc.; dual-state electronic appliances include electric lamps, switches, optical sensors, acoustic sensors, outlets with a switching function, etc.; and multi-state electric appliances include temperature-adjustable air conditioners, refrigerators, light intensity-adjustable electric lamps, and the like.

A well-managed household power grid lays a foundation for modern smart home, which not only requires functional diversity, managerial convenience, and ease for use, but also requires quick design and installation, and material efficiency, in order to satisfy the requirement of modern cities for low-carbon life. Currently, switches of household appliances are generally controlled on-site manually, and some more advanced ones are controlled through a tangible remote controller. It is hard to achieve off-site control and arbitrary control over different electric appliances.

It remains to be solved as how to achieve intelligent management over these electric appliances, how to improve the security of smart home, how to prevent intrusion, and how to lower the cost.

SUMMARY

In order to solve the issues associated with current household power grids as mentioned above, the present disclosure provides a control system for controlling a power line network (for example, a household power grid), and a power line network containing the control system, which has the advantages including simple control, easy programming, high security, and low cost.

In a first aspect, the present disclosure provides a control system for controlling a power line network having a power line, at least one electric appliance and at least one controller. The control system comprises a central control unit. The central control unit is configured to manage the power line network such that controls over the at least one electric appliance by the at least one controller is programmable; and signals for the controls are transmitted through the power line.

The control system can further include an on-site control unit, which comprises at least one modulator and at least one demodulator, each coupled with the central control unit. Each of the at least one modulator is coupled with one controller and is configured, upon receiving a first control signal from the one controller, to generate and transmit a second control signal to the central control unit. The central control unit is configured, upon receiving the second control signal, to generate a third control signal in correspondence with the second control signal, and to transmit the third control signal to the at least one demodulator. Each of the at least one demodulator is coupled to one electric appliance, and is configured, upon receiving the third control signal, to generate a fourth control signal, and to transmit the fourth control signal to, and to thereby control, the one electric appliance.

In the control system, each of the at least one controller is configured to emit a first control signal at a unique and different frequency, the central control unit is configured to receive a second control signal at more than one frequencies, and to generate and transmit a third control signal at more than one frequencies, and each of the at least one electric appliance is configured to be controlled by a fourth control signal at a unique and different frequency.

In some embodiments of the control system, the first control signal and the second control signal can have a substantially same frequency, and the third control signal and the fourth control signal can have a substantially same frequency.

In some embodiments of the control system, one second control signal corresponds to one or more third control signals, or one or more second control signals correspond to one third control signal.

In the control system, the central control unit can comprise a receiving module, an inquiry module, a storage module and a transmitting module.

The storage module is coupled with the receiving module, and is configured to store correspondence information between second control signals and the third control signals.

The receiving module is coupled with the at least one modulator through the power line, and is configured to receive a second control signal from each of the at least one modulator, and to transmit the second control signal to the inquiry module.

The inquiry module is coupled with the storage module and the transmitting module, and is configured to query the correspondence information based on the second control signal, and to transmit a corresponding third control signal to the transmitting module.

The transmitting module is coupled with the at least one demodulator through the power line and is configured to transmit the corresponding third control signal to the at least one demodulators.

In the control system, the correspondence information between second control signals and third control signals in the storage module can be stored in a mapping table.

As for the mapping table, each of the at least one electric appliance has a mode selected from a single-state mode, a dual-state mode, or a multi-state mode, wherein each state of the mode is assigned with a first identification address, corresponding to a third control signal for the each of the at least one electric appliance. Each of the at least one controller is assigned with a second identification address, corresponding to a second control signal for the each of the at least one controller. Further in the mapping table one second identification address corresponds to one or more first identification addresses; or one or more second identification addresses correspond to one first identification address.

In some embodiments of the present disclosure, the control system can further include a terminal device, which is coupled with the central control unit. The terminal device can be configured to communicate with the central control unit to thereby program the controls over the at least one electric appliance by the at least one controller.

In some embodiments of the control system, the terminal device can be further configured to directly control the at least one electric appliance.

In the control system, the central control unit can comprise a communication module, and the terminal device can be configured to communicate with the central control unit via the communication module.

The terminal device can be configured to communicate with the central control unit in a wireless manner, but can also in a wired manner.

If a wireless manner is employed, the terminal device can be configured to communicate with the central control unit via at least one of Bluetooth, WIFI, Zigbee or a cellular network. The terminal device can be configured to be capable of wireless communication, and is selected from a group consisting of a desktop, a laptop, a mobile phone, and a PAD.

In a second aspect, the present disclosure further provides a power line network. The power line network includes a power line; at least one electric appliance, each connected to the power line; at least one controller, each connected to the power line; and a control system according to any of the embodiments as described above.

In some embodiments of the power line network, the control system further comprises an on-site control unit, wherein the on-site control unit comprises at least one modulator and at least one demodulator, each coupled with the central control unit.

Each of the at least one modulator is coupled with one controller and is configured, upon receiving a first control signal from the one controller, to generate and transmit a second control signal to the central control unit. The central control unit is configured, upon receiving the second control signal, to generate a third control signal in correspondence with the second control signal, and to transmit the third control signal to the at least one demodulator. Each of the at least one demodulator is coupled to one electric appliance, and is configured, upon receiving the third control signal, to generate a fourth control signal, and to transmit the fourth control signal to, and to thereby control, the one electric appliance.

In the power line network, the at least one controller can be parallel-connected to the power line; each of the at least one controller can be series-connected to one modulator; the at least one electric appliance can be parallel-connected to the power line; and each of the at least one electric appliance can be series-connected to one demodulator.

In the power line network, the central control unit can be disposed at an initial end of the power line after entry of the power line from an external power grid into the power line network.

In the power line network, the at least one controller can comprise at least one of a switch or an outlet.

The power line network can further include an isolating power source, which is disposed between the power line network and an external power grid and is configured to guarantee a voltage and a frequency of the power line network.

By arranging electric appliances and corresponding controllers on the power line, the power line network has the following advantages. The wiring is simple and pleasing, without the need to change the wiring structure. The controlling logic is simple and easily programmable. The terminal devices can be used to select control logics, making it easy to operate and perform a timing control over the appliances. The security of the power line network can be improved, thereby preventing intrusion and lowering costs.

BRIEF DESCRIPTION OF THE DRAWINGS

To more clearly illustrate the embodiments of the disclosure, the following is a brief description of the drawings, which are for illustrative purpose only. For those of ordinary skills in the art, other drawings of other embodiments can become apparent based on these drawings.

DETAILED DESCRIPTION

In the following, with reference to the drawings of the embodiments disclosed herein, the technical solutions of the embodiments of the invention will be described in a clear and fully understandable way.

It is noted that the described embodiments are merely a portion but not all of the embodiments of the invention. Based on the described embodiments of the invention, those ordinarily skilled in the art can obtain other embodiment(s), which come(s) within the scope sought for protection by the invention.

In daily life, all basic electric appliances must be connected to the power line of the household power grid, and by additionally arranging controlling components and utilizing existing power line, an intelligent management can be achieved. To be able to adopt a wireless mode, each of the electric appliances needs to be modified or configured to include additional features.

In other words, the intelligent management cannot be realized until a wireless connection device is configured in each basic electric appliance. However, it involves an increased cost and technical difficulty. As such, a wired mode is more suitable for intelligent management of the basic electric appliances than the wireless mode.

The present disclosure a control system for controlling a power line network, and a power line network containing the control system. The power line network can be a household power grid, and the household power grid has a wired broadcasting functionality and transmits the switching control signals through the power line that originally can only transmit electric energy. In addition to realizing the intelligent management over the basic electric appliances, the house security can be improved, the intrusion can be prevented, and the costs can be lowered.

Herein "broadcasting" means that by inquiring an electric appliance control correspondence table, the central control unit can transmit a signal at a fixed frequency (a type of broadcasting) for broadcasting to all of the basic electric appliances, yet only a certain basic electric appliance corresponding to the signal at the fixed frequency can respond to the signal.

Figure 1:
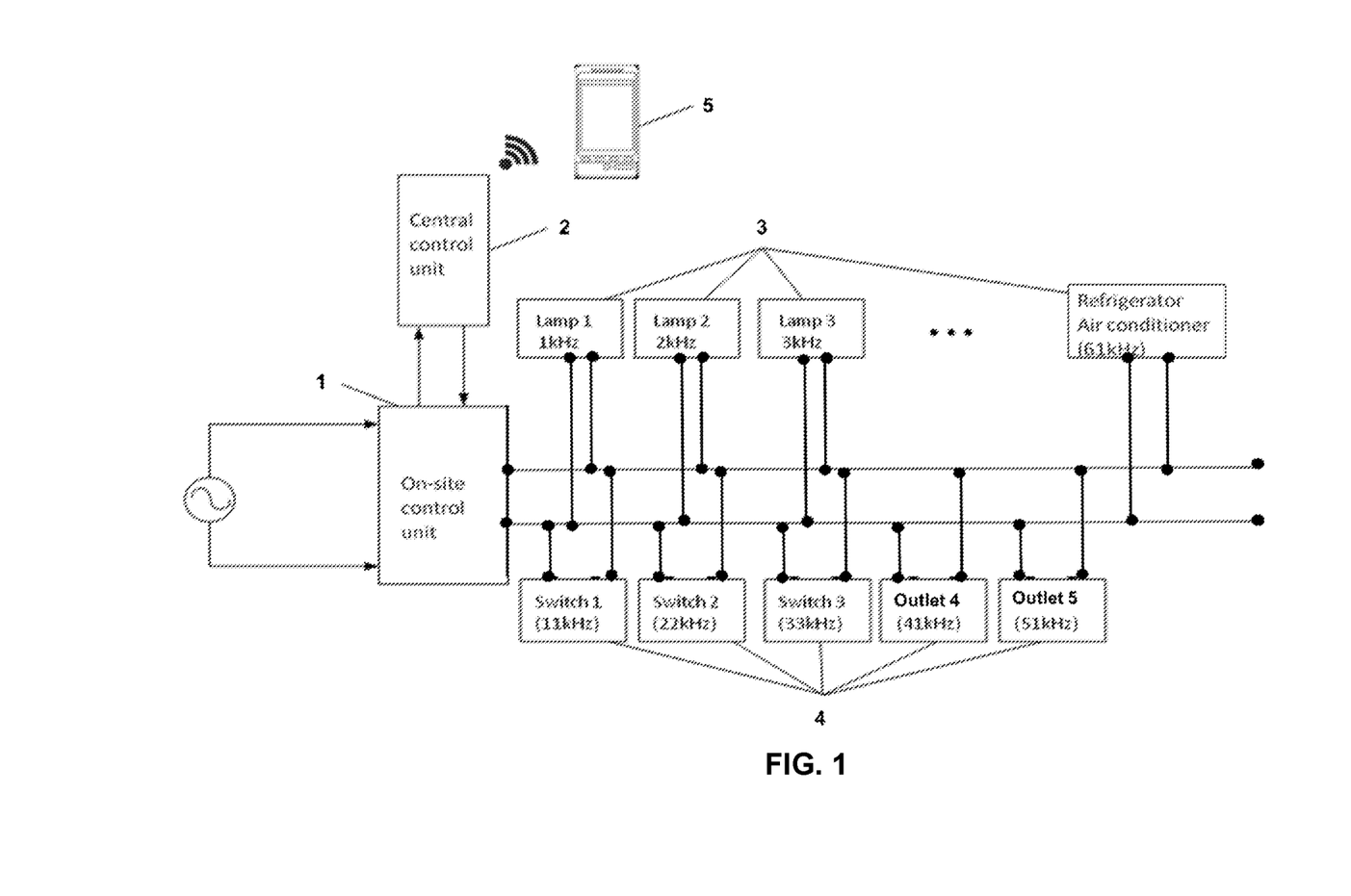
FIG. 1 is the structural diagram of a smart household power grid according to some embodiments of the disclosure.

FIG. 1 illustrates a household power grid according to some embodiments of the present disclosure. As shown in FIG. 1, the household power grid comprises a power line, a plurality of electric appliances 3 each connected to the power line, a plurality of controllers 4 corresponding to the electric appliances 3, an on-site control unit 1, and a central control unit 2.

Figure 2:
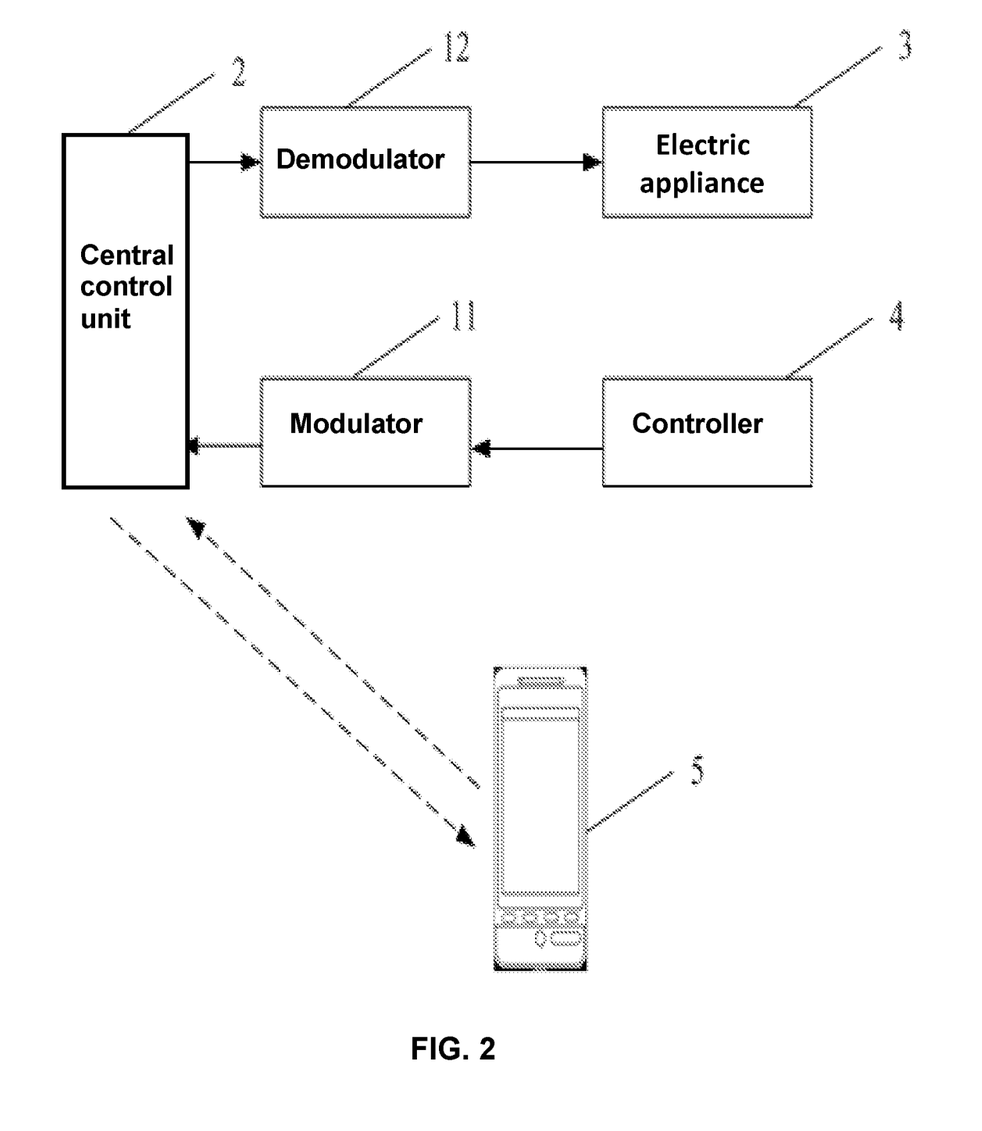
FIG. 2 is the flow chart of control signals in the smart household power grid as shown in FIG. 1.

As shown in FIG. 2, the on-site control unit 1 includes at least one modulator 11 and at least one demodulator 12.

Each of the at least one modulator 11 is coupled with a controller 4, and is configured to receive a control signal (or first control signal) from the controller, and to generate and transmit a switching control signal (or second control signal) to the central control unit 2.

Each of the at least one demodulator 12 is coupled with an electric appliance 3, and is configured to receive an on-off control signal (or third control signal) from the central control unit 2, to extract an electric appliance control signal (or fourth control signal), and to transmit the electric appliance control signal to the electric appliance 3 for turning on or off the electric appliance 3.

The central control unit 2 is coupled with both the at least one modulator 11 and the at least one demodulator 12, and is configured to receive a switching control signal from each of the at least one modulator 11, to generate a corresponding on-off control signal (i.e. to retrieve a switching control signal from each of the at least one modulator 11, so as to generate an on-off control signal based on a preset rule, or a preset correspondence relationship), and to transmit the on-off control signal to each of the at least one demodulator 12.

To ensure an accurate control over each of the electric appliances by each of the controllers in the household power grid as described above, the following are configured.

A controller 4 is configured to send a control signal at a unique frequency (i.e. a first frequency). The corresponding modulator 11 (i.e. the modulator 11 that is coupled with the controller 4) is configured, upon receiving the control signal from the controller 4, to transmit to the central control unit 2, a switching control signal at a frequency substantially identical to that of the control signal (i.e. the switching control signal is also at the first frequency).

The central control unit 2 is configured, upon receiving the switching control signals at the first frequency, to generate, and to transmit to a demodulator 12, a corresponding on-off control signal at a second frequency based on a preset correspondence relationship.

A demodulator 12 is configured, upon receiving the on-off control signal from the central control unit 2, to generate, and to transmit to a corresponding electric appliance 3, an electric appliance control signal at a frequency substantially same as the on-off control signal (i.e. the electric appliance control signal is also at the second frequency). A corresponding electric appliance 3 (i.e. the electric appliance 3 coupled with the demodulator 3) is configured to be controlled to turn on or off by the electric appliance control signal at a unique frequency (i.e. a second frequency).

Herein the first frequency (i.e. the frequency for the control signal and for the switching control signal) and the second frequency (i.e. the frequency for the on-off control signal and the electric appliance control signal) are configured to have a one-to-one relationship.

It should also be noted that in order to accommodate the needs to accurately control a plurality of electric appliances 3 by the plurality of controllers 4 respectively, the central control unit 2 is configured to be able to receive switching control signals at any frequency, and to generate and transmit on-off control signals at any frequency, the first frequencies (i.e. the frequencies of the control signals and the switching control signals) are configured to vary among different controllers 4, and the second frequencies (i.e. the frequencies of the on-off control signals and the electric appliance control signals) are configured to vary among different electric appliances 3.

In FIG. 1, the second frequencies for each of the electric appliances, such as lamp 1 (1 kHz), lamp 2 (2 kHz), lamp 3 (3 kHz), the refrigerator (61 kHz) and the air conditioner (61 kHz), and their corresponding first frequencies for switch 1 (11 kHz), switch 2 (22 kHz), switch 3 (33 kHz), outlet 4 (41 kHz) and outlet 5 (51 kHz), are only illustrated as examples. There are no limitations herein.

In the household power grid as described above, both signals and electric energy are transmitted by the power line, such that a control over each of the electric appliances 3 by a wired broadcasting can be realized. The central control unit 2 can transmit or receive signals at any frequency; an electric appliance such as an electric lamp can only respond to signals at a unique frequency; each controller 4 with the on-off control function, such as a switch and an outlet, can only transmit signals at a unique frequency. The frequencies of signals received or transmitted by all the electric appliances 3 and all the controllers 4 must be different to guarantee an accurate control.

With regard to physical connections, the controllers 4 are parallel-connected through the power line, and are series-connected with the modulators 11. The electric appliances 3 are parallel-connected through the power line and series-connected with the demodulators 12. Herein, parallel control can effectively ensure the independence of each electric appliance 3.

The electric appliances 3 can include electric lamps, outlets, refrigerators, air conditioners, televisions, and other electric appliances that access to the power line. The controllers 4 can include switches, outlets, and other controlling devices capable of controlling various electric appliances 3. There are no limitations herein.

For example, a demodulator 12 at a television side is connected with a television switch. If the demodulator 12 receives a signal at the "POWER OFF" frequency, the television switch is powered off, and the television is turned off.

As such, all the electric appliances 3 and controllers 4 can be independently connected in parallel in the household power grid, thus the wiring is simple, the control logic is simple and less susceptible for errors, and there is no need to change the wiring due to the fact that the electric appliances 3, the controllers 4 and operations are uniformly controlled by the central control unit 2.

The central control unit 2 can comprise a receiving module, an inquiry module, a storage module, and a transmitting module.

The receiving module is coupled, or connected with, the at least one modulator 11 through the power line, and is configured to receive the switching control signals from each of the at least one modulator 11, and to transmit the switching control signals to the inquiry module.

The storage module is coupled with the receiving module, and is configured for storing a mapping table of the switching control signals and the on-off control signals, wherein the switching control signals correspond to the on-off control signals in a one-to-one relationship.

The inquiry module is coupled with the storage module and the transmitting module, and is configured to query the switching control signals from the mapping table stored in the storage module, to obtain the on-off control signals, and to transmit the on-off control signals to the transmitting module. The mapping table thus serves a signal transmission and correspondence look-up table.

The transmitting module is coupled, or connected with, the at least one demodulator 12 through the power line and is configured to, upon receiving the on-off control signals, transmit the on-off control signals to each of the at least one demodulator 12.

In order to provide a user with the convenience for setting the corresponding control relationship between the electric appliances 3 and the controllers 4 to allow flexible control, the central control unit 2 can further comprise a communication module, which allows the central control unit 2 to swap information with the user through a terminal device 5, wherein the information is updated and stored into the mapping table.

The terminal device 5 can be wirelessly coupled with the central control unit 2, and can be configured to allow the user to set the state of the electric appliances 3, to set a timed control over the electric appliances, to set the correspondence between one or more controllers 4 and the electric appliances 3, and to monitor the current state of the controllers 4 and the electric appliances 3. In other words, by means of the terminal device 3, it can achieve an off-site control (i.e. a remote control) over the electric appliances 3 and a programmable configuration of the correspondence between the controllers 4 and the electric appliances 3 to allow a flexible control of the electric appliances 3 by on-site or off-site controllers.

The terminal device 5 can include a mobile phone and a PAD, and can communicate with the central control unit 2 through a wireless network. Flexible setting and control can be achieved by employing commonly used terminals.

By means of the wireless network, the central control unit 2 can be programmed by a terminal device 5 such as a mobile phone, so the states of all the electric appliances 3 can be set, and the mapping table of the correspondence between the controllers 4 and the electric appliances 3 can further be flexibly set.

For example, one or more controllers 4 can be mapped to correspond to one electric appliance (for example, an electric lamp) in the mapping table, such that the one or more controllers 4 can simultaneously control the on-off status of the electric lamp. As such, a user can conveniently utilize a terminal device, such as a mobile phone and/or a PAD, to set a control logic relationship, so as to select a more convenient mode for operating the electric appliances 3, or to time the controllers 4, to thereby realize a more flexible setting, a better management, and an easy operation of the electric appliances 3.

For example, an electric lamp in a living room can be programmed to be turned on or off through a switch in the living room or a switch in a bedroom. A outlet can be controlled to be powered on or off, such that children are prevented from getting an electric shock, and that the safety of household electricity is guaranteed.

In another example, by means of an application in the terminal device 5, timed control information can be set while setting the corresponding relationship between the controllers 4 and the electric appliances 3. As such, at the set time, the central control unit 2 can transmit the control signals to the electric appliances 3 corresponding to the controllers 4 to turn on or off the electric appliances 3.

For example, in a scenario that one switch controls ON/OFF of one electric lamp, the following corresponding mapping relationships can be set:

|  | Electric lamps | | | |
| --- | --- | --- | --- | --- |
|  | L1 | L2 | L3 | L4 |
| Controllers | K1 | K2 | K3 | K4 |

In the table: L stands for an electric lamp, and K stands for a controller. The corresponding relationship between L and K can be changed at will.

It should be noted that an electric appliance 3 can have a single-state, a dual-state, or a multi-state mode. In the household power grid of the embodiment, each state mode can be equipped with an identification address having a unique corresponding frequency with a controller 4 in the mapping table. Alternatively, a combination of multiple identification addresses can have a unique corresponding frequency with a controller 4 in the mapping table.

As such, each single-state electric appliance 3 such as an electric lamp, a switch, or an outlet, can have its own identification address, and each dual-state or multi-state electric appliance can have multiple identification addresses. Each identification address is a unique frequency signal identifier and can respond only to a signal at one frequency. For a multi-state electric appliance 3 such as a refrigerator or an air conditioner, multiple identification addresses can be set and combined, such that multiple states can be controlled conveniently.

For example: in a scenario of achieving control by various different switches and combinations thereof, the following corresponding mapping relationships can be set:

|  | Electric lamps | | |
| --- | --- | --- | --- |
|  | L1 | L2 L3 | L4 |
| Controllers | K1 | K2 | K3 | K4 |

As an example, the central control unit 2 can be a programmable controlling device and can be disposed at an initial end of the power line after home entry. Electric appliances 3 in a smart home in the household power grid can be controlled by the programmable controlling device, so as to realize an overall control over all the indoor electric appliances.

The modulators 11 and the demodulators 12 are employed to modulate and demodulate the signals respectively, and are configured to be able to receive and transmit signals at any assigned frequency. In practice, the household power grid can be flexibly designed according to specific scenarios, and there are no limitations herein.

Figure 3:
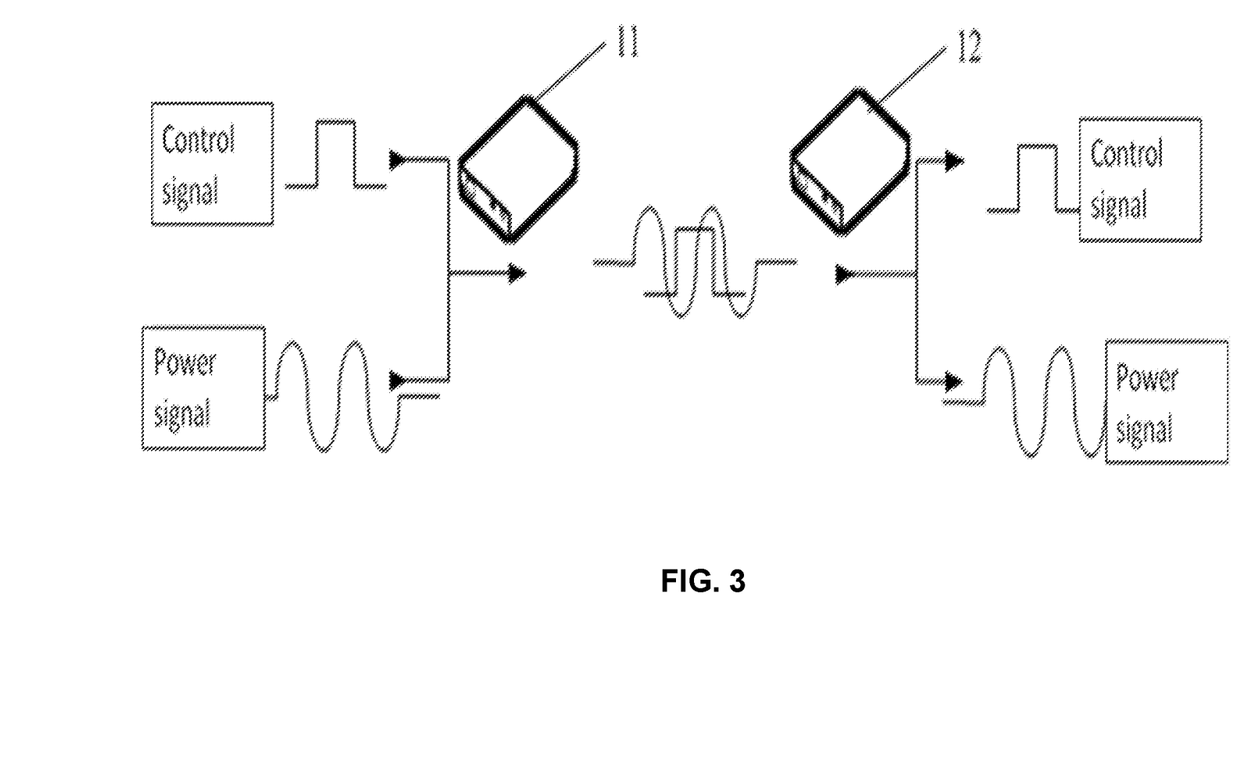
FIG. 3 is the schematic diagram of the signal transformation between the modulators and the demodulators.

As shown in FIG. 3, the modulators 11 serve to impose control signals that are useful for electric appliance control to the power line, such that the control signals and power signals are jointly transmitted through the power line. The demodulators 12 serve to demodulate the control signals that are useful for control over the electric appliances through the power line. The signal flow direction in FIG. 2 is as follows: controllers 4→modulators 11→central control unit 2→demodulators 12→electric appliances 3.

In the household power grid disclosed herein, the electric appliances can be controlled by means of both switches and applications, so as to provide convenience to people.

In some embodiments, an isolating power source can be arranged between the household power grid and a community power grid before home entry, so as to guarantee the home-entry voltage and frequency of the household power grid. The isolating power source enables the household power grid and the community grid to be relatively independent of each other, making a household power grid free of influences from the community grid.

Meanwhile, a frequency filtering system can be additionally arranged in a household power grid after home entry. The system allows only the signals of power lines with a frequency of 50 Hz to pass, thereby preventing intrusion and enhancing security of smart home.

By arranging the electric appliances and the controllers corresponding to the electric appliances on the power line, the household power grid in the embodiments has the following advantages. The wiring is simple and pleasing with no need to change the wiring structure, and the control logic is simple and easy to program. By using a terminal device to select the control logic relationships, the operation and timed control over household appliances can become easy and convenient. The security of smart home can be improved to thereby prevent intrusion and lower relevant costs.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A control system for controlling a power line network having a power line, at least one electric appliance and at least one controller, wherein the control system comprises a central control unit, wherein the central control unit is configured to manage the power line network such that:
    controls over the at least one electric appliance by the at least one controller is programmable; and
    signals for the controls are transmitted through the power line;
    the control system further comprising an on-site control unit, wherein the on-site control unit comprises at least one modulator and at least one demodulator, each coupled with the central control unit, wherein:
    each of the at least one modulator is coupled with the at least one controller and is configured, upon receiving a first control signal from the at least one controller, to generate and transmit a second control signal to the central control unit;
    the central control unit is configured, upon receiving the second control signal, to generate a third control signal in correspondence with the second control signal, and to transmit the third control signal to the at least one demodulator;
    each of the at least one demodulator is coupled to the at least one electric appliance, and is configured, upon receiving the third control signal, to generate a fourth control signal, and to transmit the fourth control signal to, and to thereby control, the at least one electric appliance;
    the central control unit comprises a receiving module, an inquiry module, a storage module and a transmitting module;
    the storage module is coupled with the receiving module, and is configured to store correspondence information between the second control signal and the third control signal;
    the receiving module is coupled with the at least one modulator through the power line, and is configured to receive the second control signal from each of the at least one modulator, and to transmit the second control signal to the inquiry module;
    the inquiry module is coupled with the storage module and the transmitting module, and is configured to query the correspondence information based on the second control signal, and to transmit the corresponding third control signal to the transmitting module; and
    the transmitting module is coupled with the at least one demodulator through the power line and is configured to transmit the corresponding third control signal to the at least one demodulator.

2. The control system of claim 1, wherein:
    each of the at least one controller is configured to emit the first control signal at a unique and different frequency;
    the central control unit is configured to receive the second control signal at more than one frequency, and to generate and transmit the third control signal at more than one frequencies;
    each of the at least one electric appliance is configured to be controlled by the fourth control signal at a unique and different frequency.

3. The control system of claim 2, wherein:
    the first control signal and the second control signal have a same frequency; and
    the third control signal and the fourth control signal have a same frequency.

4. The control system of claim 3, wherein:
    the second control signal is one of a plurality of second control signals;
    the third control signal is one of a plurality of third control signals; and
    one of the plurality of second control signals corresponds to one or more of the plurality of third control signals; or
    one or more of the plurality of second control signals correspond to one of the plurality of third control signals.

5. The control system of claim 4, wherein the correspondence information between the plurality of second control signals and the plurality of third control signals in the storage module is stored in a mapping table.

6. The control system of claim 5, wherein:
    each of the at least one electric appliance has a mode selected from a single-state mode, a dual-state mode, or a multi-state mode, wherein each state of the mode is assigned with a first identification address, corresponding to the third control signal for the each of the at least one electric appliance;

each of the at least one controller is assigned with a second identification address, corresponding to the second control signal for the each of the at least one controller; and in the mapping table one second identification address corresponds to one or more first identification addresses; or one or more second identification addresses correspond to one first identification address.

7. The control system of claim 1, further comprising a terminal device, coupled with the central control unit, wherein:

the terminal device is configured to communicate with the central control unit to thereby program the controls over the at least one electric appliance by the at least one controller.

8. The control system of claim 7, wherein the terminal device is further configured to directly control the at least one electric appliance.

9. The control system of claim 7, wherein:

the central control unit comprises a communication module; and the terminal device is configured to communicate with the central control unit via the communication module.

10. The control system of claim 7, wherein the terminal device is configured to communicate with the central control unit in a wireless manner.

11. The control system of claim 10, wherein the terminal device is configured to communicate with the central control unit via at least one of Bluetooth, WIFI, Zigbee or a cellular network.

12. The control system of claim 10, wherein the terminal device is capable of wireless communication, and is selected from a group consisting of a desktop, a laptop, a mobile phone, and a PAD.

13. A power line network comprising the control system according to claim 1, and further comprising:

the power line;

the at least one electric appliance, each connected to the power line; and the at least one controller, each connected to the power line.

14. The power line network of claim 13, wherein:

the at least one controller is parallel-connected to the power line;

each of the at least one controller is series-connected to one modulator;

the at least one electric appliance is parallel-connected to the power line; and each of the at least one electric appliance is series-connected to one demodulator.

15. The power line network of claim 13, wherein the central control unit is disposed at an initial end of the power line after entry of the power line from an external power grid into the power line network.

16. The power line network of claim 13, wherein the at least one controller comprises at least one of a switch or an outlet.

17. The power line network of claim 13, further comprising an isolating power source, disposed between the power line network and an external power grid and configured to guarantee a voltage and a frequency of the power line network.

* * * * *